US011720385B2

(12) United States Patent
Urias et al.

(10) Patent No.: US 11,720,385 B2
(45) Date of Patent: Aug. 8, 2023

(54) AUTOMATED PLATFORM TO ASSESS COMMERCIAL OFF THE SHELF (COTS) SOFTWARE ASSURANCE (71) Applicant: National Technology & Engineering Solutions of Sandia, LLC, Albuquerque, NM (US)

(72) Inventors: Vincent Urias, Albuquerque, NM (US); David Jakob Fritz, Fort Collins, CO (US); Caleb Loverro, Albuquerque, NM (US); Richard James Strong, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 420 days.

(21) Appl. No.: 16/902,341

(22) Filed: Jun. 16, 2020

(65) Prior Publication Data
US 2020/0394064 A1    Dec. 17, 2020

Related U.S. Application Data (60) Provisional application No. 62/862,524, filed on Jun. 17, 2019.

(51) Int. Cl.
*G06F 9/455*    (2018.01)
*G06F 8/53*    (2018.01)
(Continued)

(52) U.S. Cl.
CPC .......... *G06F 9/45558* (2013.01); *G06F 8/53* (2013.01); *G06F 12/08* (2013.01);
(Continued)

(58) Field of Classification Search
None
See application file for complete search history.

(56) References Cited

U.S. PATENT DOCUMENTS 9,032,400 B1 *   5/2015   Thomas ................ G06F 11/008
                                                          718/1
9,244,743 B1 *   1/2016   Scott ..................... G06F 9/5077
(Continued)

OTHER PUBLICATIONS

Hebbal et al., "Virtual Machine Introspection: Techniques and Applications," 2015, IEEE, p. 676-685. (Year: 2015).*

*Primary Examiner* — Qing Chen
(74) *Attorney, Agent, or Firm* — Yee & Associates, P.C.

(57) ABSTRACT

A computer-implemented method of verifying software is provided. The method comprises creating a number of virtual machines that simulate computing environments and running a number of software program on the virtual machines. The software programs have full access to the simulated computing environments, but the source code of the software program is unavailable. A hypervisor performs virtual machine introspection as the software programs run on the virtual machines, wherein the virtual machines and software programs are unaware the virtual machine introspection is being performed. Telemetry data is collected about the software programs, including any identified threats posed by the software programs to the simulated computing environments, and presented to a user via an interface.

33 Claims, 5 Drawing Sheets

(51) Int. Cl.
*G06F 12/08* (2016.01)
*G06N 20/00* (2019.01)

(52) U.S. Cl.
CPC .............. *G06F 2009/45562* (2013.01); *G06F 2009/45583* (2013.01); *G06F 2009/45587* (2013.01); *G06F 2212/151* (2013.01)

(56) References Cited

U.S. PATENT DOCUMENTS

| | | | | |
|---|---|---|---|---|
| 2004/0225877 | A1* | 11/2004 | Huang | G06F 21/552 713/100 |
| 2009/0055693 | A1* | 2/2009 | Budko | G06F 9/45558 718/1 |
| 2009/0288084 | A1* | 11/2009 | Astete | G06Q 30/0603 718/1 |
| 2009/0328170 | A1* | 12/2009 | Williams | H04L 63/105 718/1 |
| 2011/0214111 | A1* | 9/2011 | Vidal | G06F 8/65 717/168 |
| 2013/0179971 | A1* | 7/2013 | Harrison | G06F 21/55 726/23 |
| 2014/0259169 | A1* | 9/2014 | Harrison | G06F 21/554 726/23 |
| 2016/0314297 | A1* | 10/2016 | Tu | G06F 9/45558 |
| 2016/0366185 | A1* | 12/2016 | Lee | G06F 9/45558 |

\* cited by examiner

AUTOMATED PLATFORM TO ASSESS COMMERCIAL OFF THE SHELF (COTS) SOFTWARE ASSURANCE

CROSS-REFERENCE TO RELATED APPLICATION

This application claims the benefit of U.S. Provisional Application No. 62/862,524 filed Jun. 17, 2019, which is incorporated herein by reference.

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The disclosure relates generally to software assessment, and more specifically to assessing commercial off the shelf software for which no source code is available.

2. Description of the Related Art

The current processes for software evaluation typically apply strict requirements and scrutiny on internally developed applications that have source code available to the testers. There seems to be disproportionate focus on internally developed software. Where source code is provided, there are hundreds of tests (e.g., in the case of Checkmarxs, 4600 rules) that can range from software quality issues, vulnerabilities that encompass to legitimate threats, identification of open source library threats, and threats that may never be exposed due to the application's location.

For commercial off the shelf (COTS) applications, for which no source is available, analysis is typically a "paper" exercise involving assessing qualities such as known common vulnerabilities and exposures (CVEs), foreign ownership, control, or influence (FOCI), etc. COTS applications are typically not evaluated with the same amount of rigor and analysis that internal tools face. Arguably, the amount of risk that is potentially introduced by these COTS solutions to a network is unmitigated and unknown. The software supply chain might be compromised before being introduced into an operational environment. Mitigating vulnerabilities and understanding if the software poses a threat to network may be two separate questions.

Therefore, it would be desirable to have a method and apparatus that take into account at least some of the issues discussed above, as well as other possible issues.

SUMMARY

An illustrative embodiment provides computer-implemented method of verifying software. The method comprises creating a number of virtual machines that simulates a number of computing environments and running a number of software programs on the virtual machines. The software programs have full access to the simulated computing environment, but the source code of the software programs is unavailable. A hypervisor performs virtual machine introspection as the software programs run on the virtual machines, wherein the virtual machines and software programs are unaware the virtual machine introspection is being performed. Telemetry data is collected about the software programs, including any identified threats posed by the software programs to the simulated computing environments, and presented to a user via an interface.

Another illustrative embodiment provides a computer program product for verifying software. The computer program product comprises a computer-readable storage medium having program instructions embodied thereon to perform the steps of: creating a number of virtual machines that simulate a number of computing environments; running a number of software programs on the virtual machines, wherein the software programs have full access to the simulated computing environments, and wherein source code of the software programs is unavailable; performing virtual machine introspection using a hypervisor as the software programs run on the virtual machines, wherein the virtual machines and software programs are unaware the virtual machine introspection is being performed; collecting telemetry data about the software programs including any identified threats posed by the software programs to the simulated computing environments; and presenting the telemetry data to a user via an interface.

Another illustrative embodiment provides a system for verifying software. The system comprises a bus system; a storage device connected to the bus system, wherein the storage device stores program instructions; and a number of processors connected to the bus system, wherein the number of processors execute the program instructions to: create a number of virtual machines that simulate a number of computing environments; run a number of software programs on the virtual machines, wherein the software programs have full access to the simulated computing environments, and wherein source code of the software programs is unavailable; perform virtual machine introspection using a hypervisor as the software programs run on the virtual machines, wherein the virtual machines and software programs are unaware the virtual machine introspection is being performed; collect telemetry data about the software programs including any identified threats posed by the software programs to the simulated computing environments; and present the telemetry data to a user via an interface.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that identifying software subversion is not the same as looking for malicious activity. Current approaches comprise looking for code similarity to malicious codes and running the code through virus scanners. However, this approach will not necessarily find malicious code because the COTS code is legitimate and passes all these tests.

The illustrative embodiments also recognize and take into account that the threats and activities that subverted software will exhibit can be characterized differently. For example, software might phone home to a strange server, look for open shares, open ports, attempt to migrate to other process, enumerate running processes, and enumerate logged in users, domain information, etc. Such behaviors are not typically performed by normal software. However, static source code analysis might not necessarily look for these types of behaviors, the rationale being that all the actions can be, and are, legitimate types of activities. However, these behaviors can be measured in an objective way.

In the face of more and more sophisticated malware, the illustrative embodiments focus on curating a list of weak indicators of trust (or distrust). This process includes both static and dynamic behavioral analysis of the binary as well as the larger ecosystem in which the sample runs, including network phenomena. Each of these indicators contributes to a body of evidence to establish a confidence and trust level for the software in question.

The illustrative embodiments provide a semi-automated analytics pipeline to look for key indicators of suspect behaviors quantitatively. This semi-automated process can be supplemented with reverse engineering of the application to determine if the behavior is benign or not. The reviewer can be provided with a dashboard on a user interface (UI) with N many tests indicating either: 1. the software did not exhibit that indicator, or 2. it did exhibit the indicator and warrants further investigation. In addition to static analysis and endpoint-based dynamic behavioral analysis, the illustrative embodiments perform network introspection and scanning on the sample and larger ecosystem.

Illustrative embodiments provide a portable platform that can analyze applications, provide results, archive the results, and compare different versions of the software. Results are archived along with the scripts that are used to analyze the software, the virtual machines (VMs) that are built, the source binaries, and the results. If there are any new indicators that warrant investigation, the entire suite of software can be re-run and evaluated for a specific risk. Measurements can also be made to track how the software versions have changed, how the behavior has changed, and if anything should be examined further.

Figure 1:
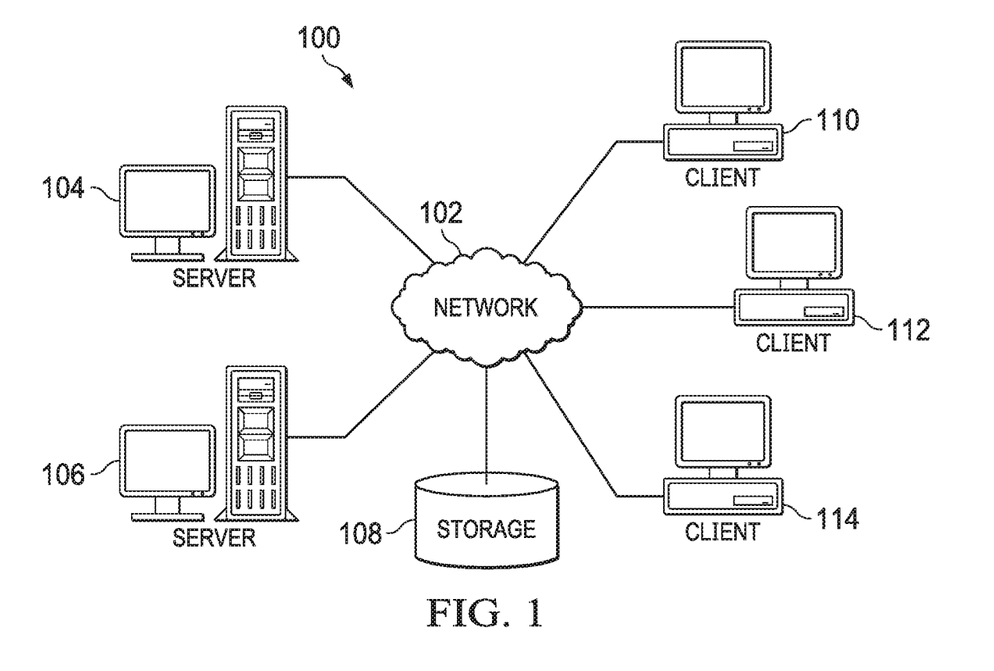
FIG. 1 is an illustration of a block diagram of an information environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
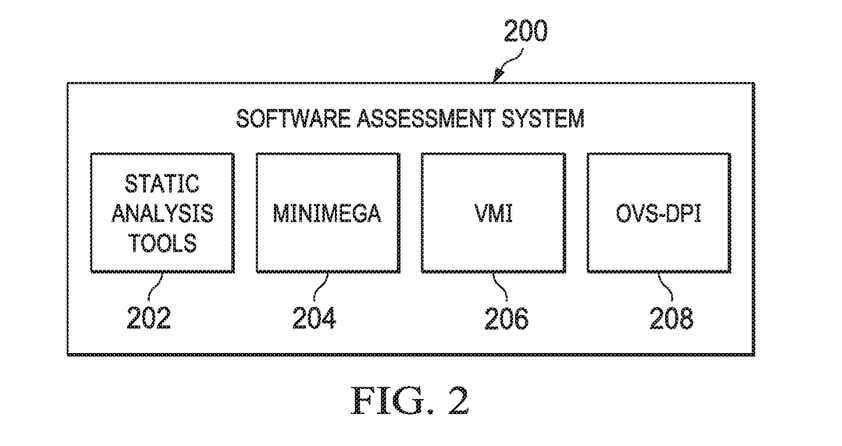
FIG. 2 depicts a block diagram of a software assessment system in accordance with illustrative embodiments.

FIG. 2 depicts a block diagram of a software assessment system in accordance with illustrative embodiments. Software assessment system 200 can be used to implement using one or more server and client computer system in FIG. 1. The software assessment system 200 integrates a number of tools to allow both static and dynamic analysis of software. Static analysis tools 202 analyze the software, typically source code or some form of object code, without actually executing the code. Static analysis information includes, e.g., hashes, strings, existing binary similarity tools, etc.

Minimega 204 is a tool for launching and managing virtual machines (VMs). It can launch and manage VM-based experiments and set up complex virtual network topologies in a repeatable manner, and it can integrate real hardware with virtual experiments.

Virtual Machine Introspection (VMI) 206 monitors the runtime state of a virtual machine. VMI 206 tracks events such as interrupts, memory writes, etc., or sends requests to the VM. VMI can be used for forensic analysis of software by providing insight into what is happening inside a host VM while guest software is running on it.

Open vSwitch and deep packet inspection (OVD-DPI) 208 facilitate network and host introspection. OVS provides a software implemented, multi-layer network switch running within a VM hypervisor. DPI inspects data packets sent over a computer network to ensure they are in the correct format, and to check for malicious code and other illicit activity. OVS-DPI 208 provides metadata extraction and over 1200 protocols for classification. OVS-DPI 208 can be fused with VMI data to produce new analytics.

Figure 3:
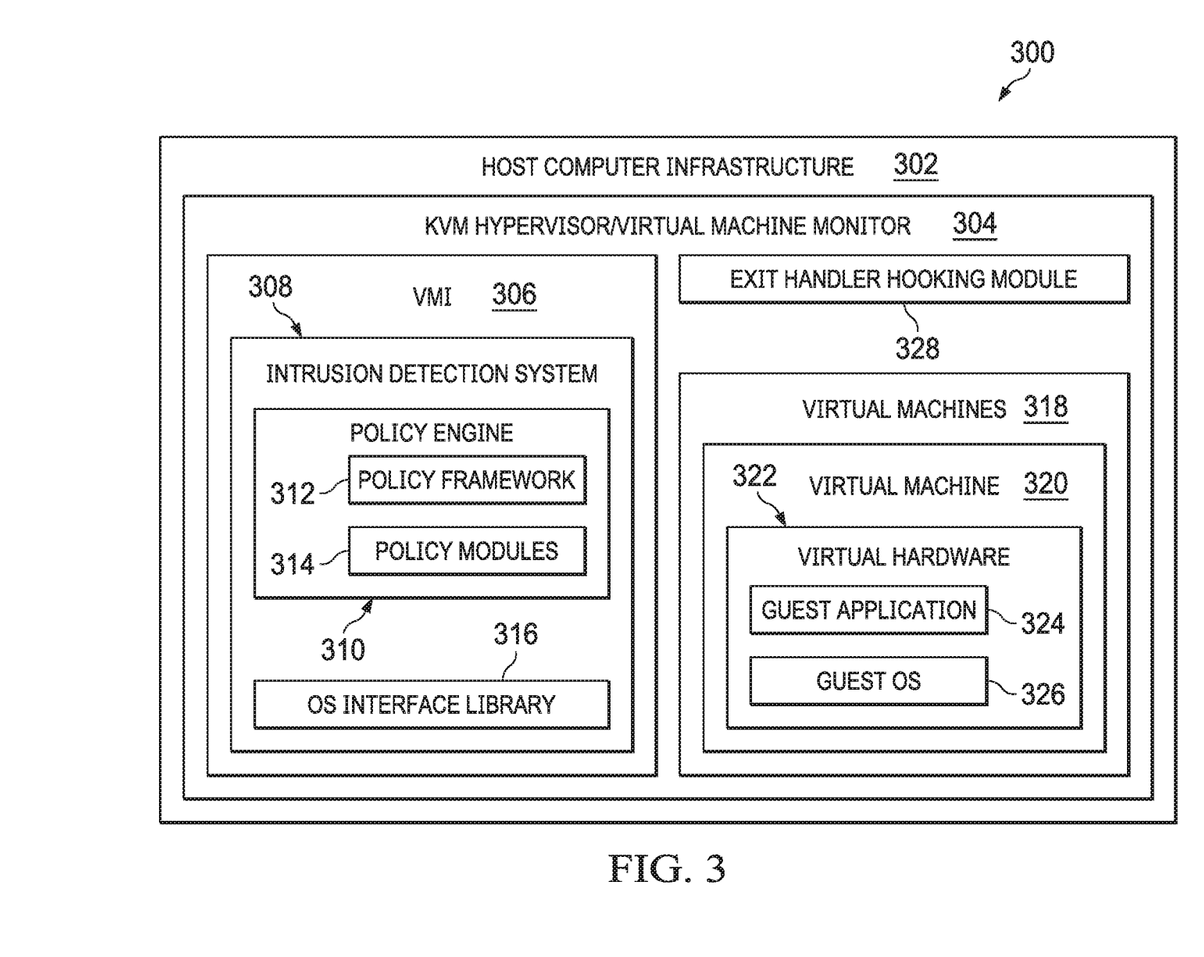
FIG. 3 depicts a block diagram of a virtual machine introspection system in accordance with illustrative embodiments.

FIG. 3 depicts a block diagram of a virtual machine introspection system in accordance with illustrative embodiments. System 300 comprises a host computer infrastructure 302 on which VMs 318 and VMI 306 run. VMI 306 is an example of VMI 206 in FIG. 2. The host computer infrastructure 302 is able to host a number of VMs 318. In an embodiment, up to 2000 VMs can be hosted on a single physical server. Each VM 320 among the number of VMs 318 comprises virtual hardware 322 on which run a guest operating system (OS) 326 and a guest application 324. In the illustrative embodiments, the guest application 324 is the software being assessed.

VMI system 306 comprises an intrusion detection system (IDS) 308, which analyzes the states and events of the VMs 318 through the hypervisor/virtual machine monitor (VMM) 304. The IDS 308 comprises a policy engine 310 and an OS library interface 316. The policy engine 310 comprises a framework 312 for building policies and policy modules 314 that implement specific intrusion detection policies. The OS interface library 316 provides an OS-level view of a VM 320 by interpreting the hardware state exported by the VMM 304. The function of the policy engine 310 is to execute policies of the IDS 308 by using the OS interface library 316 and interface with the VMM 304.

The VMM 304 isolates the guest application 324 running in a VM 320 and can access VM states such as CPU state (e.g., registers), memory, input/output (I/O) device state simulated in the virtual hardware 322. Isolation prevents any intruder code present on a VM 320 from tampering with the IDS 308. Because the VMM 304 can directly inspect a VM 320, it is difficult for intruder code to evade the IDS 308 since there is no state in the monitored VM 320 that the IDS 308 cannot see.

When VMI 306 is running, useful data is immediately captured from a running guest OS 326. This data includes all system calls with parameters (syscalls), which enables monitoring of all file creates/reads/writes, socket creation, API functions (e.g., NtWriteVirtualMemory), registry key access/read/write, etc. VMI 306 can read guest OS 326 memory while allowing the user to see and retain copies of all running processes (regardless whether guest application 324 sees them or not) and all libraries loaded into memory, including drivers. VMI 306 does not require predetermined knowledge of guest OS 326 to provide guest OS build details, symbols, or system.map.

Typical VMI provides effective tools for network monitoring such as secure socket layer (SSL) interception and packet capture (PCAP)/DPI. However, it often lacks understanding of what is happening on the guest VM, which is treated as a forensics operation. Often the context is lost, introspection is not in real-time, and the introspection is a "read-only" type of access.

The illustrative embodiments employ a kernel virtual machine (KVM) for the hypervisor/VMM 304. A KVM is a virtualization module in an OS kernel that allows the kernel to function as a hypervisor. By using a KVM for the hypervisor/VMM 304, the illustrative embodiments are able to introspect and understand the dynamic behavior of the VMs 318 without introducing artifacts into a running system, such that a virtual machine 320 and guest application 324 are unaware the introspection is being performed, as well as to control the VM 320 and make changes to it.

Normally, the VMs 318 will run until something causes them to VM-exit, which passes control to the hypervisor/VMM 304 and allows it to view and/or modify their state. In the illustrative embodiments, a kernel module 328 hooks the VM-exit handler of the KVM hypervisor/VMM 304 to gain complete control over guest VMs 318 before the KVM 304 knows the VMs 318 have exited. Hooking the exit handler allows VMI 306 to effectively "be" the hypervisor 304, i.e. kernel virtual machine introspection (KVMI). At a low level of granularity, maximum control includes hypervisor-level execution during every VM-exit, reading or writing any VM state desired by the user, and modifying the hypervisor configuration/state, e.g., to enable or disable hardware virtualization features or force future exits with various tricks.

Therefore, whereas prior methods of VMI perform introspection with a VMI system working through a hypervisor, the illustrative embodiments perform the introspection using the hypervisor itself.

The OS capabilities of the illustrative embodiments include, e.g., raw system calls, decoded system calls, process identification number (PID) extraction, guest execution, kernel carving, process carving, process tracking (i.e. start and stop), file extraction, biometrics, socket chardev, VM aging, and guest/host file transfer.

Open source information sources such as, e.g., domain name system (DNS) can be used to create realistic responses in the simulated environment to trigger malware. The KVMI of the illustrative embodiments also have the ability to provide false responses to malware survey techniques such as VM detection and the type of hypervisor. Given guest memory, KVMI can use SSL keys to decrypt traffic in real-time, perform secure shell (SSH) decryption in real-time, and perform encrypted file interception in real-time.

Figure 4:
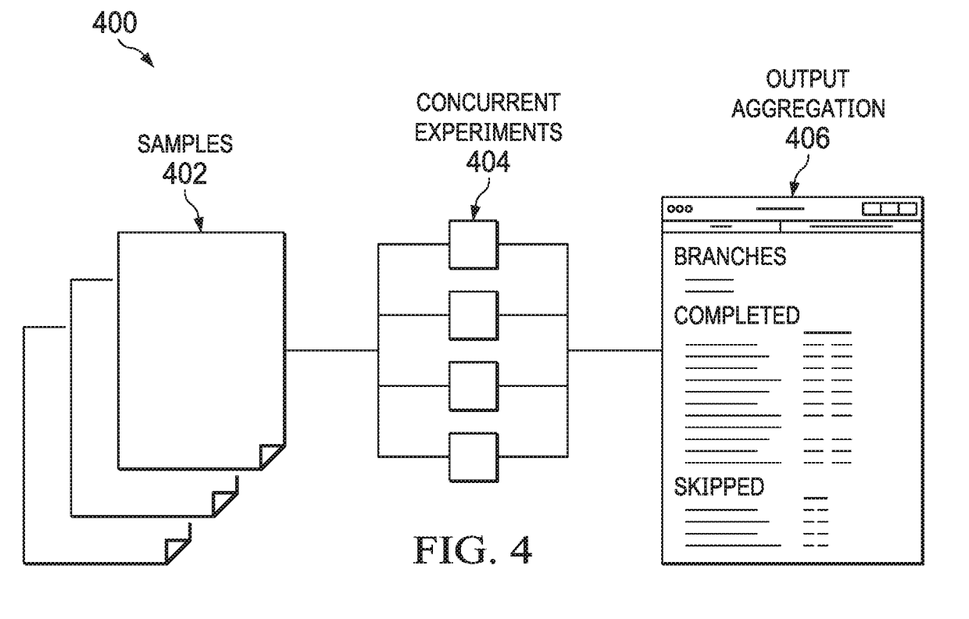
FIG. 4 depicts a system for conducting concurrent VMI experiments in accordance with illustrative embodiments.

FIG. 4 depicts a system for conducting concurrent VMI experiments in accordance with illustrative embodiments. By leveraging the ability of minimega, emulytics system 400 provides the ability to conduct multiple concurrent experiments 404 on a number of samples 402. Any type of software can be used as an input. Samples 402 can include samples of different, unrelated applications/software or alternatively might comprise different versions of the same application/software (i.e. older/newer versions).

Concurrent experiments 404 might comprise alternate VM configurations running the same software. Alternatively, the VM configuration can be held as a control, and alternate software versions can be run concurrently in multiple copies of that configuration. Templates can be used to drive any number of concurrent experiments.

Output aggregation 406 allows telemetry data to be compared between alternated software versions and/or alternate VM system configurations.

Figure 5:
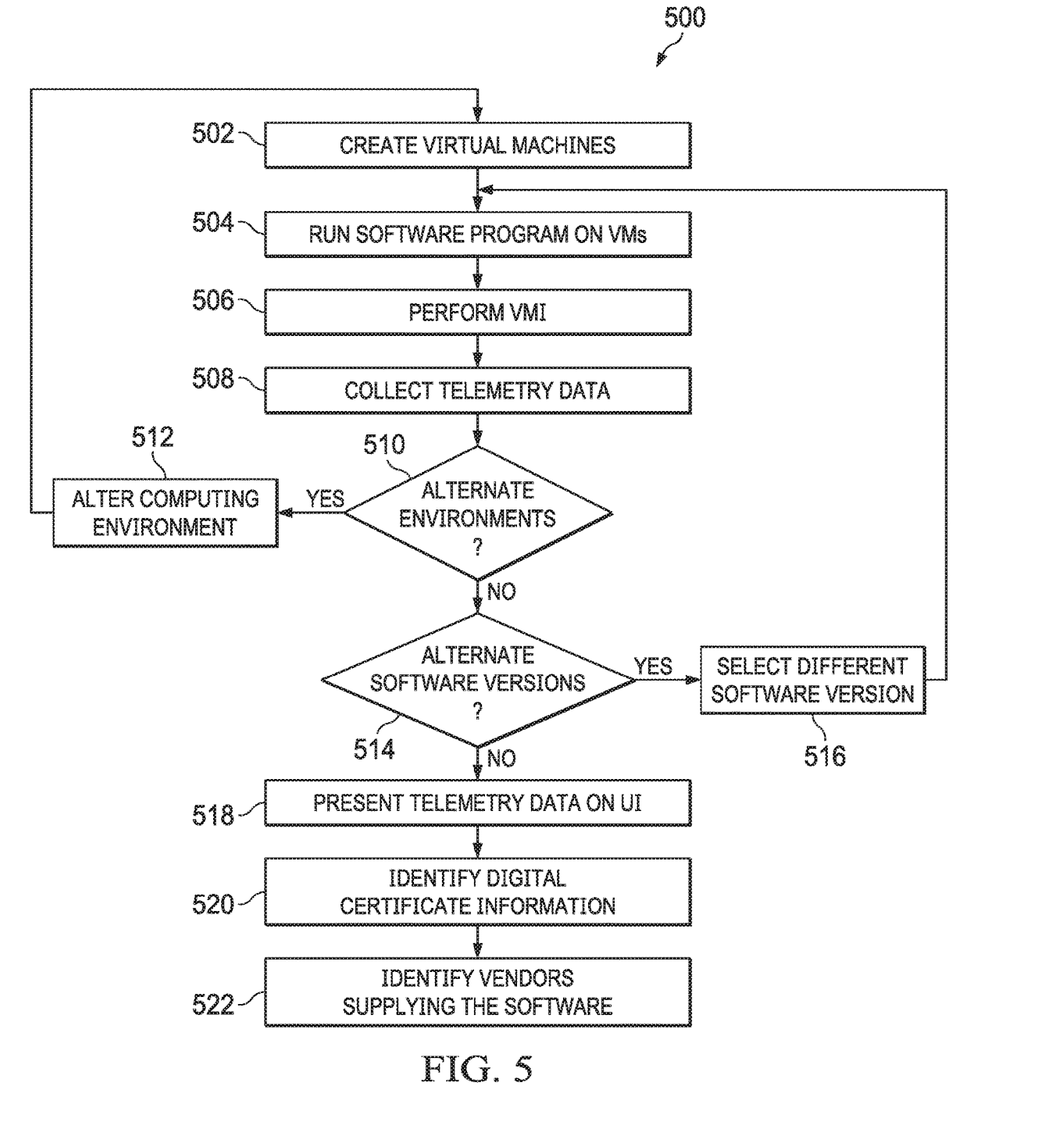
FIG. 5 depicts a flowchart for virtual machine introspection in accordance with illustrative embodiments.

FIG. 5 depicts a flowchart for virtual machine introspection in accordance with illustrative embodiments. Process 500 can be implemented using data processing systems such as those depicted in FIGS. 1-3. Process 500 begins by creating a number of VMs that simulate a number of specified computing environments (step 502). The VMs might emulate a host and network environment.

A number of guest software programs are then run on the VMs (step 504). The guest software programs have full access to the simulated computing environments in the VMs. In many cases, such as COTS programs, the source code of the software programs is unavailable.

As the guest software programs run on the VMs, the host system performs virtual machine introspection using a hypervisor (step 506). Because of the VM-exit handler hooking described above, the VMs and guest software programs are unaware that the virtual machine introspection is being performed. The VMI can provide false environmental or time information to the software programs and measure differences in software program execution in response to the false information.

The VMI collects telemetry data about the software programs including any identified threats posed by the software programs to the simulated computing environments (step 508).

Process 500 also comprises determining if there are alternate computing environments that can be simulated (step 510). If there are alternate computing environments to simulate, the VMI alters the computing environments simulated by the VMs to provoke changes in execution states of the software programs (step 512). Execution behaviors of the software programs can then be mapped to specific computing environments. It should be noted that VMI for alternate computing environments can also be run concurrently, as explained above in reference to FIG. 4. Machine learning can be applied to the changes in execution states of the software program to determine expected behavior, variance, and outlier behavior.

The VMI then determines if there are alternate versions of the program, e.g., newer versions (step 514). If there are different/newer versions, the VMI selects and runs the updated versions of the software programs on the VMs and compares telemetry data for the different versions of the software programs (step 516). As with alternate computing environments in step 512, the alternate/updated versions of the software can be run concurrently on a number of VMs.

Telemetry data collected by the VMI is presented to the user through a UI (step 518).

Process 500 might also comprise identifying digital certificate information associated with the software programs (step 520) and identifying a number of vendors supplying the software program based on the digital certificate information (step 522). Identifying the vendors supplying the software can help vulnerabilities in the software supply chain.

Figure 6:
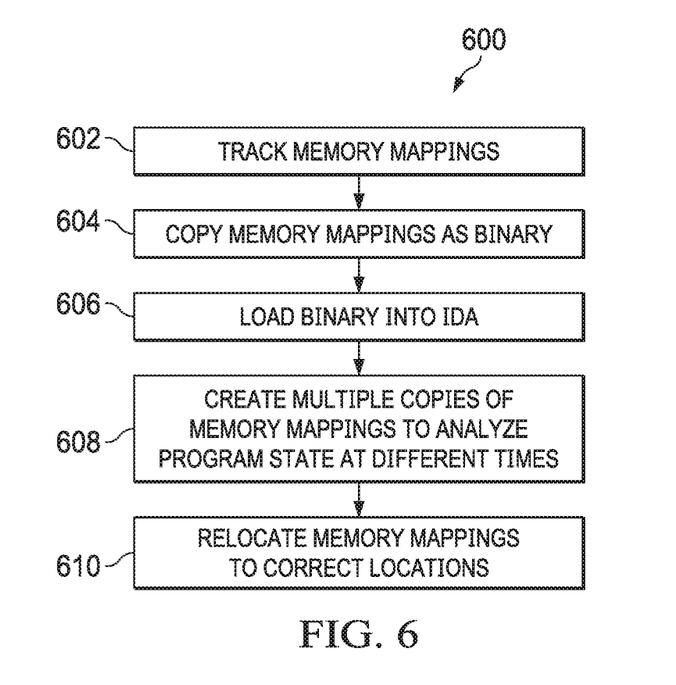
FIG. 6 depicts a flowchart for deep virtual machine introspection in accordance with illustrative embodiments.

FIG. 6 depicts a flowchart for deep virtual machine introspection in accordance with illustrative embodiments. Process 600 is an extension of step 506 in FIG. 5. The virtual machine introspection further comprises tracking all memory mappings in the virtual machines including libraries and operating system code in addition to software program code (step 602).

The VMI periodically copies the memory mappings as binary (step 604) and loads the binary into an interactive disassembler (IDA) (step 606).

The IDA creates multiple copies of the memory mappings to analyze a program state at different times during execution (step 608). A script (e.g., idapython script) then relocates all memory mappings to correct locations (step 610).

Figure 7:
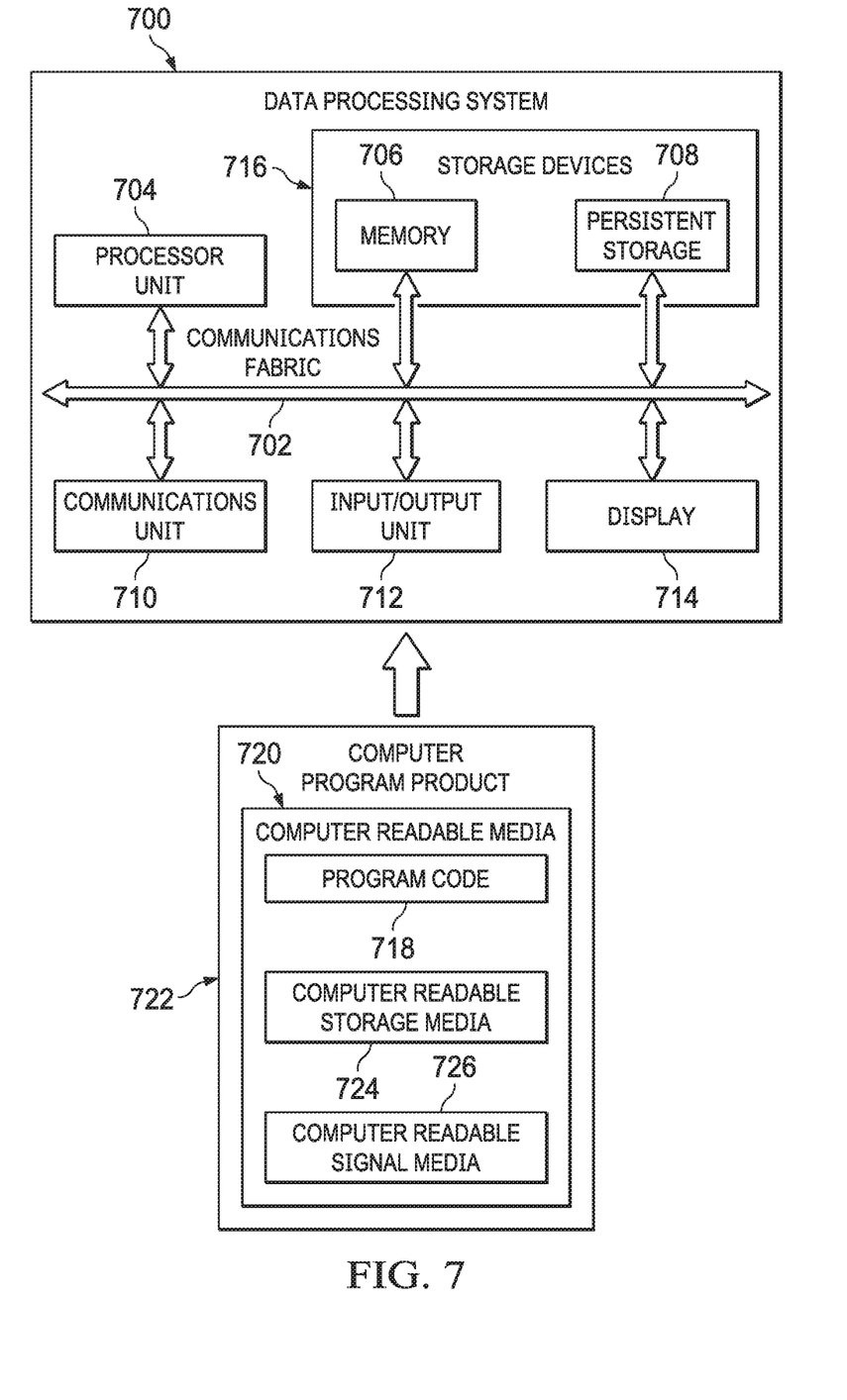
FIG. 7 is a diagram of a data processing system depicted in accordance with an illustrative embodiment.

Turning to FIG. 7, a diagram of a data processing system is depicted in accordance with an illustrative embodiment. Data processing system 700 is an example of a system in which computer-readable program code or program instructions implementing processes of illustrative embodiments may be run. Data processing system 700 may be used to implement one or more computers and client computer system 112 in FIG. 1. In this illustrative example, data processing system 700 includes communications fabric 702, which provides communications between processor unit 704, memory 706, persistent storage 708, communications unit 710, input/output unit 712, and display 714.

Processor unit 704 serves to execute instructions for software applications and programs that may be loaded into memory 706. Processor unit 704 may be a set of one or more hardware processor devices or may be a multi-processor core, depending on the particular implementation. Further, processor unit 704 may be implemented using one or more heterogeneous processor systems, in which a main processor is present with secondary processors on a single chip. As another illustrative example, processor unit 704 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 706, in these examples, may be, for example, a random access memory, or any other suitable volatile or non-volatile storage device. Persistent storage 708 may take various forms, depending on the particular implementation. For example, persistent storage 708 may contain one or more devices. For example, persistent storage 708 may be a hard drive, a flash memory, a rewritable optical disk, a rewritable magnetic tape, or some combination of the above. The media used by persistent storage 708 may be removable. For example, a removable hard drive may be used for persistent storage 708.

Communications unit 710, in this example, provides for communication with other computers, data processing systems, and devices via network communications unit 710 may provide communications using both physical and wireless communications links. The physical communications link may utilize, for example, a wire, cable, universal serial bus, or any other physical technology to establish a physical communications link for data processing system 700. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 700.

Input/output unit 712 allows for the input and output of data with other devices that may be connected to data processing system 700. For example, input/output unit 712 may provide a connection for user input through a keypad, keyboard, and/or some other suitable input device. Display 714 provides a mechanism to display information to a user and may include touch screen capabilities to allow the user to make on-screen selections through user interfaces or input data, for example.

Instructions for the operating system, applications, and/or programs may be located in storage devices 716, which are in communication with processor unit 704 through communications fabric 702. In this illustrative example, the instructions are in a functional form on persistent storage 708. These instructions may be loaded into memory 706 for running by processor unit 704. The processes of the different embodiments may be performed by processor unit 704 using computer-implemented program instructions, which may be located in a memory, such as memory 706. These program instructions are referred to as program code, computer-usable program code, or computer-readable program code that may be read and run by a processor in processor unit 704. The program code, in the different embodiments, may be embodied on different physical computer-readable storage devices, such as memory 706 or persistent storage 708.

Program code 718 is located in a functional form on computer-readable media 720 that is selectively removable and may be loaded onto or transferred to data processing system 700 for running by processor unit 704. Program code 718 and computer-readable media 720 form computer program product 722. In one example, computer-readable media 720 may be computer-readable storage media 724 or computer-readable signal media 726. Computer-readable storage media 724 may include, for example, an optical or magnetic disc that is inserted or placed into a drive or other device that is part of persistent storage 708 for transfer onto a storage device, such as a hard drive, that is part of persistent storage 708. Computer-readable storage media 724 also may take the form of a persistent storage, such as a hard drive, a thumb drive, or a flash memory that is connected to data processing system 700. In some instances, computer-readable storage media 724 may not be removable from data processing system 700.

Alternatively, program code 718 may be transferred to data processing system 700 using computer-readable signal media 726. Computer-readable signal media 726 may be, for example, a propagated data signal containing program code 718. For example, computer-readable signal media 726 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 718 may be downloaded over a network to persistent storage 708 from another device or data processing system through computer-readable signal media 726 for use within data processing system 700. For instance, program code stored in a computer-readable storage media in a data processing system may be downloaded over a network from the data processing system to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to, or in place of, those illustrated for data processing system 700. Other components shown in FIG. 7 can be varied from the illustrative examples shown. The different embodiments may be implemented using any hardware device or system capable of executing program code. As one example, data processing system 700 may include organic components integrated with inorganic components and/or may be comprised entirely of organic components excluding a human being. For example, a storage device may be comprised of an organic semiconductor.

As another example, a computer-readable storage device in data processing system 700 is any hardware apparatus that may store data. Memory 706, persistent storage 708, and computer-readable storage media 724 are examples of physical storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706 or a cache such as found in an interface and memory controller hub that may be present in communications fabric 702.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of verifying software programs, the computer-implemented method comprising:

creating, by a number of processors, a number of virtual machines that simulate a number of computing environments;

running, by the number of processors, a number of software programs on the virtual machines, wherein the software programs have full access to the computing environments simulated by the virtual machines, and wherein source code of the software programs is unavailable;

performing, by the number of processors, virtual machine introspection using a hypervisor as the software programs run on the virtual machines, wherein the virtual machine introspection tracks all memory mappings in the virtual machines including libraries, operating system code, and software program code, and wherein the virtual machines and software programs are unaware that the virtual machine introspection is being performed using the hypervisor;

collecting, by the number of processors, telemetry data about the software programs including any identified threats posed by the software programs to the Gimulated computing environments simulated by the virtual machines; and presenting, by the number of processors, the telemetry data about the software programs to a user via an interface.

2. The computer-implemented method of claim 1, further comprising:

periodically copying the memory mappings as binary; and loading the binary into an interactive disassembler.

3. The computer-implemented method of claim 2, further comprising creating multiple copies of the memory mappings to analyze a program state at different times during execution.

4. The computer-implemented method of claim 1, further comprising relocating all memory mappings to correct locations.

5. The computer-implemented method of claim 1, further comprising:

altering the computing environments simulated by the virtual machines to provoke changes in execution states of the software program; and mapping execution behaviors of the software programs to specific computing environments.

6. The computer-implemented method of claim 5, further comprising applying machine learning to the changes in execution states of the software program to determine expected behavior, variance, and outlier behavior.

7. The computer-implemented method of claim 1, wherein the virtual machines emulate a host and network environment.

8. The computer-implemented method of claim 1, further comprising:

providing false environmental or time information to the software programs; and measuring differences in software program execution in response to the false environmental or time information.

9. The computer-implemented method of claim 1, further comprising:

running a number of updated versions of the software programs on the virtual machines; and comparing telemetry data for the updated versions of the software programs.

10. The computer-implemented method of claim 1, further comprising:

identifying digital certificate information associated with the software programs; and identifying a number of vendors supplying the software programs based on the digital certificate information.

11. The computer-implemented method of claim 1, wherein a kernel module hooks a virtual machine exit handler of the hypervisor to gain control over the virtual machines.

12. A computer program product for verifying software programs, the computer program product comprising:

a computer-readable storage medium having program instructions embodied thereon to perform the steps of:

creating a number of virtual machines that simulate a number of computing environments;

running a number of software programs on the virtual machines, wherein the software programs have full access to the computing environments simulated by the virtual machines, and wherein source code of the software programs is unavailable;

performing virtual machine introspection using a hypervisor as the software programs run on the virtual machines, wherein the virtual machine introspection tracks all memory mappings in the virtual machines including libraries, operating system code, and software program code, and wherein the virtual machines and software programs are unaware that the virtual machine introspection is being performed using the hypervisor;

collecting telemetry data about the software programs including any identified threats posed by the software programs to the computing environments simulated by the virtual machines; and presenting the telemetry data about the software programs to a user via an interface.

13. The computer program product of claim 12, further comprising instruction for program instructions to perform the steps of:

periodically copying the memory mappings as binary; and loading the binary into an interactive disassembler.

14. The computer program product of claim 13, further comprising program instructions to perform the step of creating multiple copies of the memory mappings to analyze a program state at different times during execution.

15. The computer program product of claim 12, further comprising program instructions to perform the step of relocating all memory mappings to correct locations.

16. The computer program product of claim 12, further comprising program instructions to perform the steps of:

altering the computing environments simulated by the virtual machines to provoke changes in execution states of the software program; and mapping execution behaviors of the software programs to specific computing environments.

17. The computer program product of claim 16, further comprising program instructions to perform the step of applying machine learning to the changes in execution states of the software programs to determine expected behavior, variance, and outlier behavior.

18. The computer program product of claim 12, wherein the virtual machines emulate a host and network environment.

19. The computer program product of claim 12, further comprising program instructions to perform the steps of:

providing false environmental or time information to the software programs; and measuring differences in software program execution in response to the false environmental or time information.

20. The computer program product of claim 12, further comprising program instructions to perform the steps of:

running a number of updated versions of the software program on the virtual machine; and comparing telemetry data for the updated versions of the software programs.

21. The computer program product of claim 12, further comprising program instructions to perform the steps of:

identifying digital certificate information associated with the software programs; and identifying a number of vendors supplying the software programs based on the digital certificate information.

22. The computer program product of claim 12, wherein a kernel module hooks a virtual machine exit handler of the hypervisor to gain control over the virtual machines.

23. A system for verifying software programs, the system comprising:
 a bus system;
 a storage device connected to the bus system, wherein the storage device stores program instructions; and
 a number of processors connected to the bus system, wherein the number of processors execute the program instructions to:
  create a number of virtual machines that simulate a number of computing environments;
  run a number of software programs on the virtual machines, wherein the software programs have full access to the computing environments simulated by the virtual machines, and wherein source code of the software programs is unavailable;
  perform virtual machine introspection using a hypervisor as the software programs run on the virtual machines, wherein the virtual machine introspection tracks all memory mappings in the virtual machines including libraries, operating system code, and software program code, and wherein the virtual machines and software programs are unaware that the virtual machine introspection is being performed using the hypervisor;
  collect telemetry data about the software programs including any identified threats posed by the software program to the computing environments simulated by the virtual machines; and
  present the telemetry data about the software programs to a user via an interface.

24. The system of claim 23, wherein the number of processors further execute the program instructions to:
 periodically copy the memory mappings as binary; and
 load the binary into an interactive disassembler.

25. The system of claim 24, wherein the number of processors further execute the program instructions to create multiple copies of the memory mappings to analyze a program state at different times during execution.

26. The system of claim 23, wherein the number of processors further execute the program instructions to relocate all memory mappings to correct locations.

27. The system of claim 23, wherein the number of processors further execute the program instructions to:
 alter the computing environments simulated by the virtual machines to provoke changes in execution states of the software programs; and
 map execution behaviors of the software program to specific computing environments.

28. The system of claim 27, wherein the number of processors further execute the program instructions to apply machine learning to the changes in execution states of the software programs to determine expected behavior, variance, and outlier behavior.

29. The system of claim 23, wherein the virtual machines emulate a host and network environment.

30. The system of claim 23, wherein the number of processors further execute the program instructions to:
 provide false environmental or time information to the software programs; and
 measure differences in software program execution in response to the false environmental or time information.

31. The system of claim 23, wherein the number of processors further execute the program instructions to:
 run a number of updated versions of the software programs on the virtual machines; and
 compare telemetry data for the updated versions of the software programs.

32. The system of claim 23, wherein the number of processors further execute the program instructions to:
 identify digital certificate information associated with the software programs; and
 identify a number of vendors supplying the software programs based on the digital certificate information.

33. The system of claim 23, wherein a kernel module hooks a virtual machine exit handler of the hypervisor to gain control over the virtual machines.

* * * * *